(12) United States Patent  (10) Patent No.: US 7,117,887 B2
Dulac  (45) Date of Patent: Oct. 10, 2006

(54) QUICK FILL DEVICE

(76) Inventor: Lawrence M. Dulac, 45 South Rd., Deerfield, NH (US) 03037

( * ) Notice: Subject to any disclaimer, the term of this patent is extended or adjusted under 35 U.S.C. 154(b) by 236 days.

(21) Appl. No.: 10/811,108

(22) Filed: Mar. 26, 2004

(65) Prior Publication Data

US 2005/0211306 A1    Sep. 29, 2005

(51) Int. Cl.
*F16K 31/12* (2006.01)
*G05D 16/02* (2006.01)
(52) U.S. Cl. ............. 137/494; 137/505.38; 137/624.17
(58) Field of Classification Search ................ 137/461, 137/463, 494, 505, 505.38, 624.17; 271/75
See application file for complete search history.

(56) References Cited

U.S. PATENT DOCUMENTS 3,040,772 A * 6/1962 Todd ........................ 137/509
4,015,627 A * 4/1977 Bower ....................... 137/494
4,178,960 A * 12/1979 Napolitano et al. ......... 137/494
4,520,838 A * 6/1985 Fisher et al. ................ 137/69

* cited by examiner

*Primary Examiner*—Stephen M. Hepperle
(74) *Attorney, Agent, or Firm*—Bourque & Associates, PA

(57) ABSTRACT

An apparatus is adapted to be secured to a pressure regulator, relief valve, or any other valve and allows the user to control the position of the valve. According to one embodiment, the pressure regulator remains fully open until a desired maximum fill pressure within a boiler is reached. Upon reaching the maximum fill pressure, the valve is automatically and substantially instantly closed. Consequently, the pressure within the boiler never exceeds the maximum allowable pressure of the pressure relief valve, thereby preventing the accidental discharge of hot, high-pressure water from the boiler. Moreover, because the valve remains fully open until the maximum fill pressure is achieved, the amount of time to fill the boiler is substantially reduced. According to another embodiment, a relief valve remains fully closed until a maximum pressure is exceeded, whereby the valve is substantially instantly fully opened.

21 Claims, 10 Drawing Sheets

QUICK FILL DEVICE

TECHNICAL FIELD

The present invention relates to pressure regulators and more particularly, relates to a quick fill device for a pressure regulator.

BACKGROUND INFORMATION

Residential and commercial boilers, water heater, and the like 1, FIG. 1, typically include a pressure regulator 12 that regulates or controls the pressure of the water entering the boiler 1 and/or a pressure relief valve 4 that regulates or controls the maximum operating pressure. For safety reasons, boilers 1 generally operate in a pressure range of approximately 12–15 psi while water heaters and the like 1 typically operate at approximately between 15–150 psi.

It is often necessary to add water to the boiler 1. For example, during routine maintenance, it is often necessary to drain the boiler 1 using the drain valve 2 in order to relieve the pressure within the boiler 1 as well as to remove the heated water within the boiler 1. Additionally, water must often be added due to leakage, evaporation, normal operation, and other causes.

Pressure regulators 12 are typically located proximate a boiler 1 on the inlet water line 3. The pressure regulator 12 controls the amount of water/pressure within the boiler 1 by automatically adding water in the event the pressure within the boiler 1 drops below a predetermined threshold (typically approximately 12 psi). The pressure relief valve 4 serves to prevent the pressure within the boiler 1 from exceeding the maximum allowable operating pressure.

The incoming water, typically coming from the main water line located in the street, is often at a pressure significantly higher (typically in the range of approximately 20–80 psi than the 12–15 psi range that the boiler 1 operates in. The pressure regulator 12, (FIG. 2A) includes a pressure device 14 that monitors the pressure within the boiler line 5 (which is equivalent to the pressure within the boiler 1). If the pressure in the boiler line 5/boiler 1 drops below the threshold value, the valve 20 is slowly opened to allow water from the inlet water line 3 to pass through the inlet 22 of the pressure regulator 12, through the outlet 24 of the pressure regulator 12 and into the boiler line 5 where it ultimately enters the boiler 1.

Most known pressure regulators 12 include a pressure device 14 comprising a spring 16 and a diaphragm 18. The spring 18 biases against the diaphragm 18 urging the valve 20 open. The pressure within the outlet 24 acts against the diaphragm 18, urging the valve 20 closed. When the pressure within the outlet 24 is above the threshold value, the outlet pressure 24 is greater than the pressure generated by the spring 18, and the valve 20 remains closed. However, when the outlet pressure 24 drops below the threshold value, spring force 18 begins to open the valve 20, thus allowing water to pass through the pressure regulator 12 and into the boiler 1.

As discussed above, water heaters and the like 1 include relief valves 4, FIG. 2B, which regulate or control the maximum pressure within the water heater 1. The relief valve 4 includes an inlet 22, an outlet 24, and a valve 20 that is typically biased in the closed position using with a spring 16 opening against a diaphragm 18 or the like. If the pressure or temperature within the water heater 1 exceeds a maximum threshold, the biasing force of the spring 16 is overcome and the relief valve 4 opens to relief the pressure and prevent explosion/damage.

It is important to note, however, that the valves 20 of the known pressure regulators 12 and the known relief valves 4 open in direct relationship to the pressure differential between the outlet pressure 24/inlet pressure 22 and the spring pressure 18 respectively. The larger the pressure differential (i.e., the lower the outlet pressure 24 compared to the spring pressure 16 in the case of the pressure regulator 12 and the higher the inlet pressure 22 compared to the spring pressure 16 in the case of the relief valve 4), the more the valve 20 opens.

In the case of the known pressure regulators 12, this arrangement allows water from the high-pressure main water line 3 to slowly enter the boiler 1. Unfortunately, it significantly increases the time it takes to fill the boiler 1, particularly when the boiler 1 is empty. As the outlet pressure 24 begins to reach the threshold value (i.e., 12 psi), the valve 20 is gradually closed. As a result, the flow rate of the water entering the boiler 1 is gradually decreased, and the time to fill the boiler 1 is significantly increased. This is particularly a problem when the boiler 1 has been emptied (for example if a new boiler 1 is being installed or the boiler 1 has been drained for maintenance reasons). Yet another problem is that that it is often necessary to fill boiler 1 with water to a pressure above the minimum threshold value of the pressure regulator 12 in order to purge any entrapped air from the boiler 1 as well as the pipes.

To overcome this problem, a pressure regulator override lever 15 is typically installed on the pressure regulator 12. The pressure regulator override lever 15 typically includes a lever 17 and a rod 19. The rod 19 is connected to the lever 17 and the diaphragm 18. When the lever 17 is moved in the direction of arrow A, the lever 19 is forced downward which thereby moves the diaphragm 18 downward. This effectively overrides the outlet pressure 24, thereby fully opening the valve 20 and allowing the water from the main water line 3 to enter the boiler 1 at a much higher rate, thus filling the boiler 1 in a much shorter amount of time.

Unfortunately, this arrangement suffers from several problems. One problem is that the valve 20 will remain fully open at all times until the operator manually closes the valve 20. Because the main water line 3 has a pressure typically between 20–80 psi, if the valve 20 is not shut, water will enter the boiler 1 until the boiler 1 reaches in excess of approximately 30 psi. However, the pressure relief valve 4 will open at approximately 30 psi (the typical maximum operating pressure for the boiler 1). As a result, high-pressure water and/or boiling water will be suddenly released from the pressure relief valve 4. Not only will the high-pressure water damage property and create a mess as the exits the relief valve 4, it can also cause severe injury (such as severe burning) to people near the boiler 1, especially if someone is near the relief valve 4 when it opens. Moreover, if the pressure relief valve 4 malfunctions or is inadequate to handle the flow rate of the water entering the boiler 1, the boiler 1 could also be damaged and could even possibly explode.

While it is possible to manually close the pressure regulator override lever 15 prior to the relief valve 4 opening, this is often very difficult because the pressure gauge 6 is typically located far away from the pressure regulator override lever 15 and is difficult to observe. Moreover, it is common for the person working on the boiler 1 to forget that the boiler 1 is filling, and thus forget to close the pressure regulator override lever 15.

In the case of the known relief valves 4, the gradual opening of the relief valve 4 also suffers from several problems. In the event of a large, rapid pressure spike, the relief valve 4 may not open sufficiently fast enough to relief the pressure. This could ultimately result in damage to the water heater/boiler 1. Accordingly, the known relief valves 4 must be large in order to relief or discharge enough BTUs or steam capacity/volume.

Accordingly, what is needed is a device that is capable of quickly filling the boiler, water heater, or the like and/or quickly relieving pressure. According to one embodiment, the device should fully open the valve until the outlet pressure reaches a predetermined maximum value (which is preferably set below the maximum pressure of the pressure relief valve) upon which pressure regulator valve should immediately close. According to another embodiment, the device should fully open the valve once the pressure exceeds a predetermined threshold. The device should also be capable of being retrofitted to existing pressure regulators or relief valves without extensive modification. Additionally, the device should be capable of relieving or discharging a larger amount of BTUs, steam capacity/volume, or the like compared to the known valves.

SUMMARY

The present invention solves all of the problems with the prior art. According to one embodiment, a valve device overrides a pressure regulator, thereby allowing a boiler to be filled quickly and easily. According to another embodiment, the valve device immediately and instantaneously opens the valve once the pressure exceeds a predetermined threshold. The device comprises a body defining a first cavity having a base region and an opening region. A plunger is sized and shaped to fit within the first cavity of the body such that a first end region of the plunger is adapted to disposed proximate the base region of the cavity. The plunger is preferably operatively connected to the pressure regulator or relief valve.

An actuator operatively connects the plunger and the body. According to one embodiment, the actuator fully opens the pressure regulator at all times when the outlet pressure of the pressure regulator is below a maximum pressure, and automatically fully closes the pressure regulator when the outlet pressure reaches the maximum pressure. Alternatively, the actuator fully closes the valve whenever the inlet pressure is below a maximum value, and instantly and fully opens the inlet pressure exceeds the maximum value.

In the exemplary embodiment, the cavity includes an indentation (such as a circumferential slot) disposed proximate the opening region. The indentation is sized to accept a portion of a ball or bearing. The second end region of the plunger preferably includes a notch region and a guide region sized and shaped to accept a portion of the ball. The guide region forms a ramp and preferably includes a channel. The guide region is disposed within the plunger such that a first end of the guide region is proximate an outer surface of the plunger and a second end of the guide region is disposed proximate the second end region of the plunger within the notch region.

The device preferably further includes a biasing mechanism (such as a spring) disposed within the first cavity between the base region of the body and the first end region of the plunger. Additionally, the device preferably further includes a cap sized and shaped to fit within the first cavity. The cap defines a second cavity having an upper surface and a bottom surface. The upper surface is sized and shaped to fit within the notch region of plunger such that the upper surface contacts the ball.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
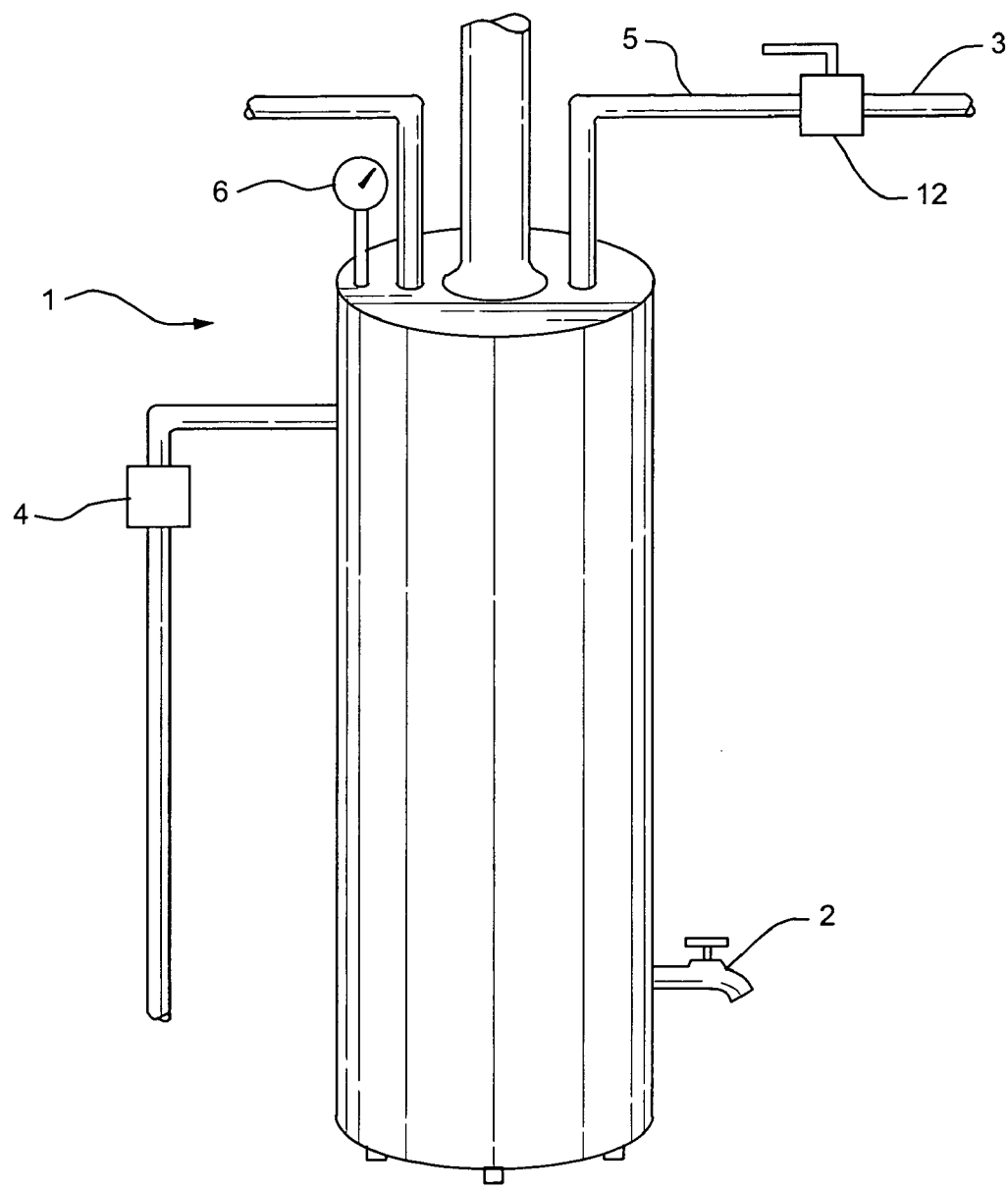
FIG. 1 is side view of one embodiment of a prior art boiler system.
Figure 3A:
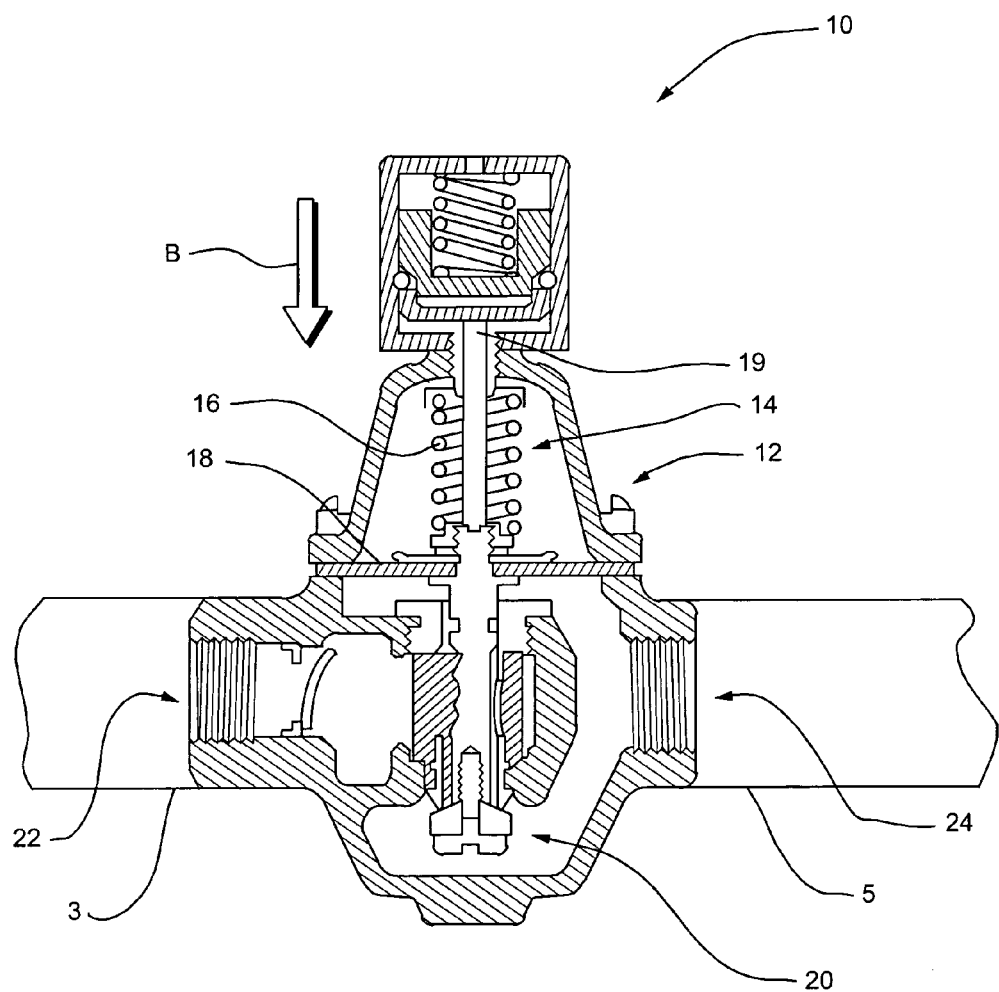
FIG. 3A is a perspective view of one embodiment of the device and a pressure regulator according to the present invention.
Figure 3B:
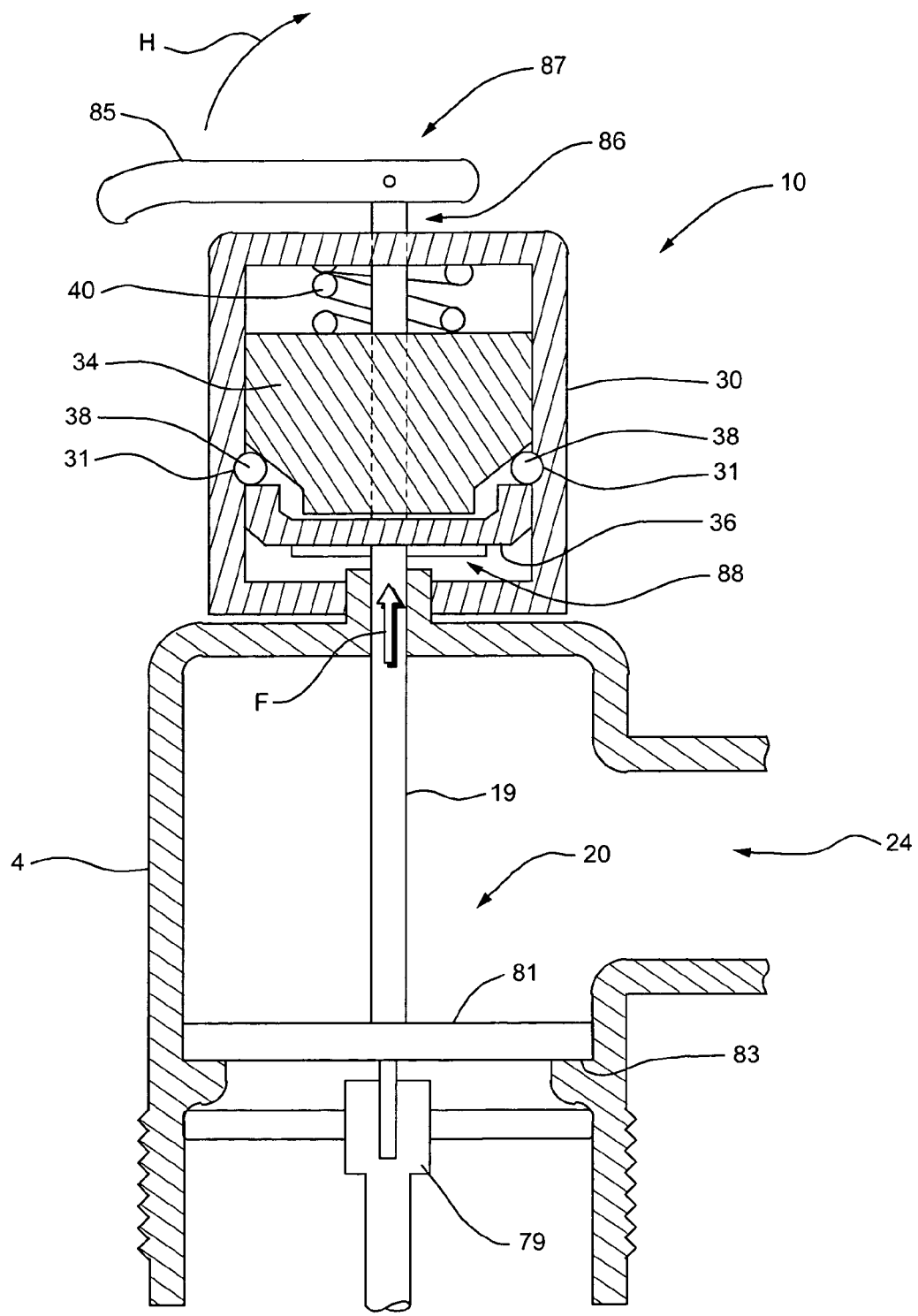
FIG. 3B is a perspective view of one embodiment of the device and a relief valve according to the present invention.

A valve controller 10, FIG. 3, for use with a boiler, water heater, or the like 1 (FIG. 1, hereinafter referred to collectively as a boiler unless otherwise noted), allows the boiler 1 to be filled in a minimum amount of time, while also preventing accidental over-pressurization of the boiler 1 and accidental discharge of water from the boiler 1. The valve controller 10 is adapted to be operatively connected to a valve 20 of a pressure regulator 12 (FIG. 3A) or relief valve 4 (FIG. 3B). When connected to the pressure regulator 12, FIG. 3A, the valve controller 10 overrides the pressure regulator 12 and allows the valve 20 to remain fully open at all times when the outlet pressure 24 is below a predetermined, maximum value. When connected to a relief valve 4, FIG. 3B, the valve controller 10 allows the valve 20 to remain fully closed at all times when the inlet pressure 22 is below a maximum preset value. It is important to note that the valve 20 does not operate proportionately to the pressure while operatively connected to the valve controller 10, but rather remains completely open or shut until the desired pressure is achieved, at which time the valve completely closes or opens depending on the circumstances. The predetermined, maximum value that the valve controller 10 closes the valve 20 is preferably set below the pressure at which the relief valve 4 (FIG. 1) open when used with a pressure regulator 12. In the case where the valve controller 10 is used with a relief valve 4, the value that the valve controller 10 opens the valve 20 is set at the maximum operating pressure.

The valve controller 10 may work with any pressure regulator 12, relief valve 4, or valve 20 in general. The pressure regulator 12, FIG. 3A, preferably includes an inlet 22 (typically connected to the main water line 3) and an outlet 24 (typically connected to the boiler 1 via boiler line 5, though it may also be directly connected to the boiler 1). In the preferred embodiment, the pressure regulator 12 also includes a pressure device 14 that operates (i.e., opens and closes) a valve 20. The pressure device 14 operates the valve 20 in relationship to a pressure differential between a maximum, predetermined operating pressure (typically 12–15 psi) and the pressure at the outlet 24. When the outlet pressure 24 is lower than the maximum, predetermined operating pressure, the valve 20 is opened and when the outlet pressure 24 is above the maximum, predetermined operating pressure, the valve 20 is closed. It is important to note that the pressure device 14 opens the valve 20 proportionately to the pressure differential (i.e., the valve 20 is opened further as the pressure differential increases and closes as the pressure differential approaches zero).

While the valve controller 10 will work with virtually any pressure regulator 12 and pressure device 14, the pressure device 14 preferably includes a diaphragm 18 operatively connected to the valve 20 and a spring 16. The spring 18 biases against the diaphragm or cartridge device 18 urging the valve 20 open. The outlet pressure 24 acts against the diaphragm 18 and urges the valve 20 closed. When the outlet pressure 24 is above the threshold value, the outlet pressure 24 is greater than the pressure generated by the spring 18, and the valve 20 remains closed. However, when the outlet pressure 24 drops below the threshold value, spring force 18 begins to open the valve 20, thus allowing water to pass through the pressure regulator 12 and into the boiler 1.

Figure 2A:
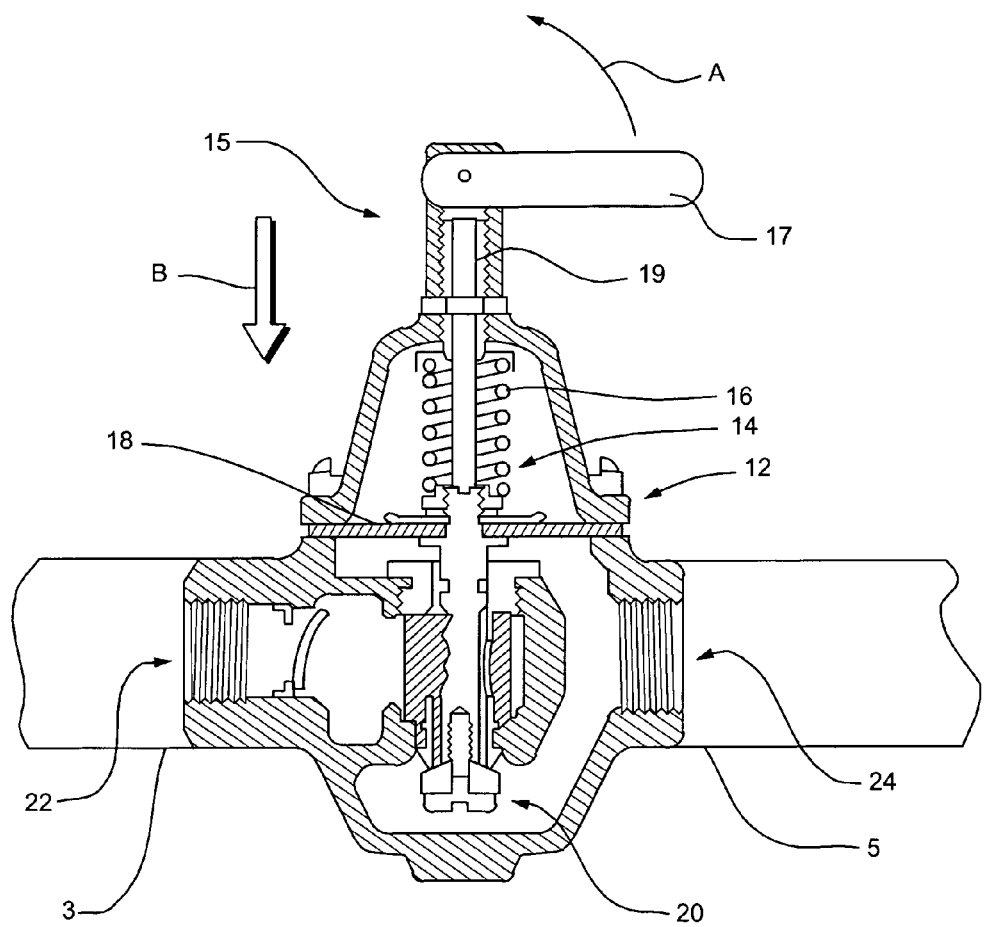
FIG. 2A is a perspective view of one embodiment of a prior art pressure regulator.
Figure 2B:
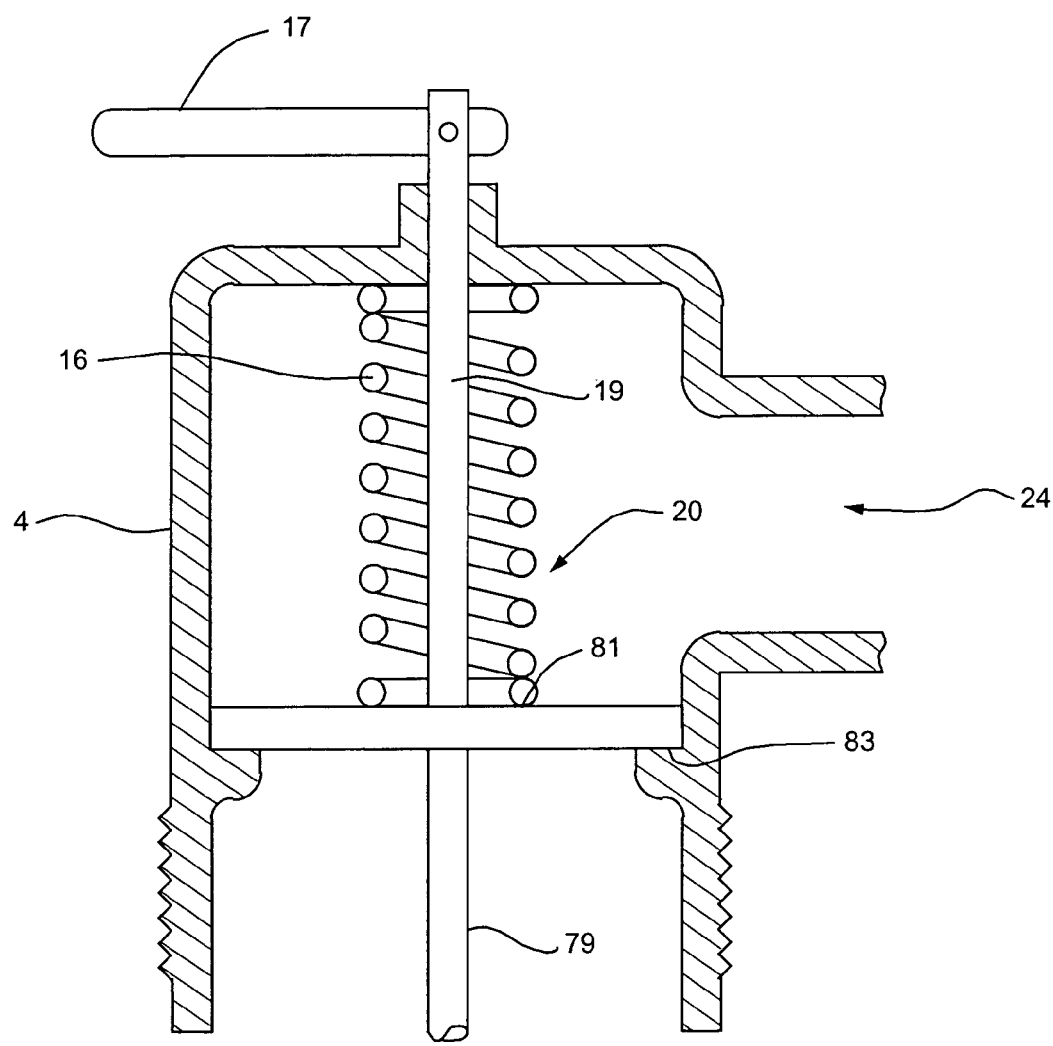
FIG. 2B is a perspective view of one embodiment of a prior art relief valve.

The valve controller 10 is preferably operatively connected to the valve 20 in such a manner as to override the pressure device 14. In the preferred embodiment, the valve controller 10 is connected to a rod 19. This rod 19 is typically installed on most pressure regulators 12 for purposes of overriding the pressure regulator 12, and forcing the valve 20 open. Traditionally, the rod 19 is connected to a manual lever 17 (FIG. 2). When the lever 17 is moved in the direction of arrow A, the rod 19 is moved downward in the direction of the arrow B and the valve 20 is manually opened until the lever 17 is closed (the position shown in FIG. 2).

According to one embodiment, lever 17 is removed from the pressure regulator 12, leaving the exposed rod 19. The valve controller 10 is then adapted to be connected to the rod 19 using any manner known to those skilled in the art. This allows the valve controller 10 to be easily retrofitted to existing pressure regulators 12. As will be discussed in greater detail hereinbelow, the valve controller 10 is preferably adapted to be removably secured to the pressure regulator 12 as well as the rod 19. Alternatively, the pressure regulator 12 may be manufactured in such a way to allow the valve controller 10 to be removably connected to the lever 19 and/or the valve 20.

In the exemplary embodiment, the valve controller 10 is secured to the rod 19 and the pressure regulator 12 (for example, but not limited to, threading the valve controller 10 to the pressure regulator 12). Once the valve controller 10 is operatively secured to the pressure regulator 12, the rod 19 is forced in the direction of arrow B, and the valve 20 is opened.

Figure 4:
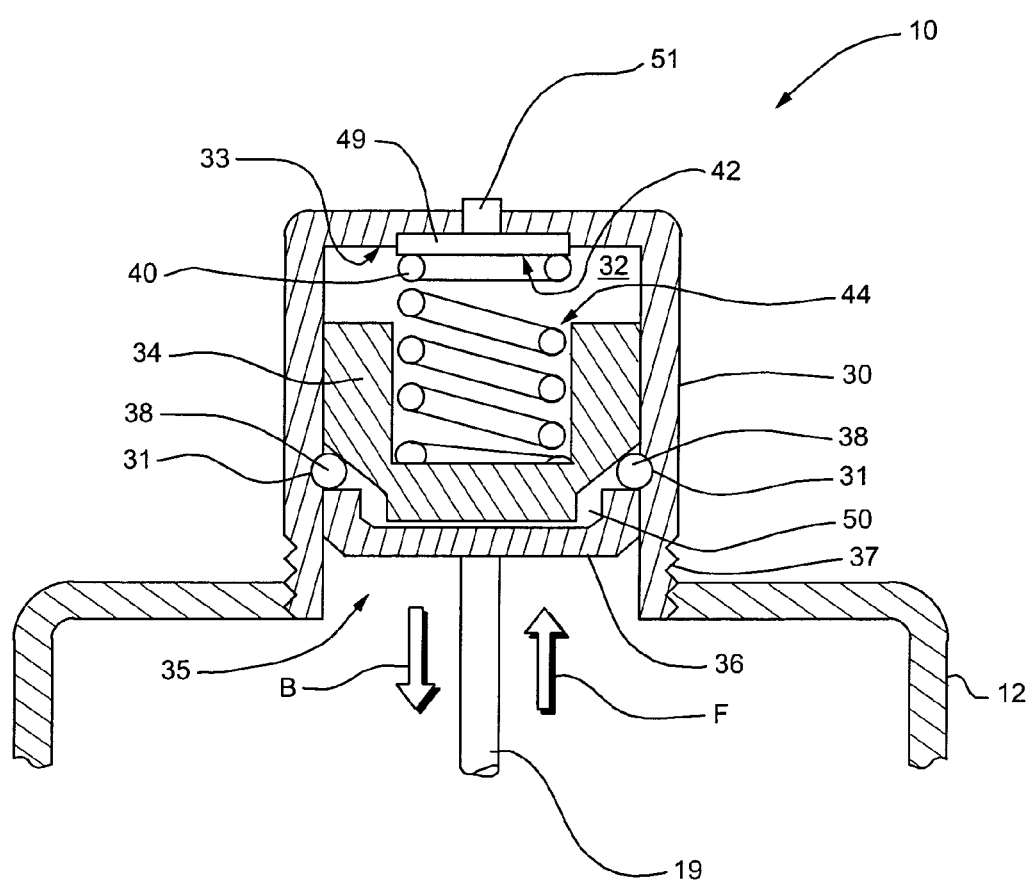
FIG. 4 is a perspective view of the device shown in FIG. 3 in an expanded position according to the present invention.
Figure 5:
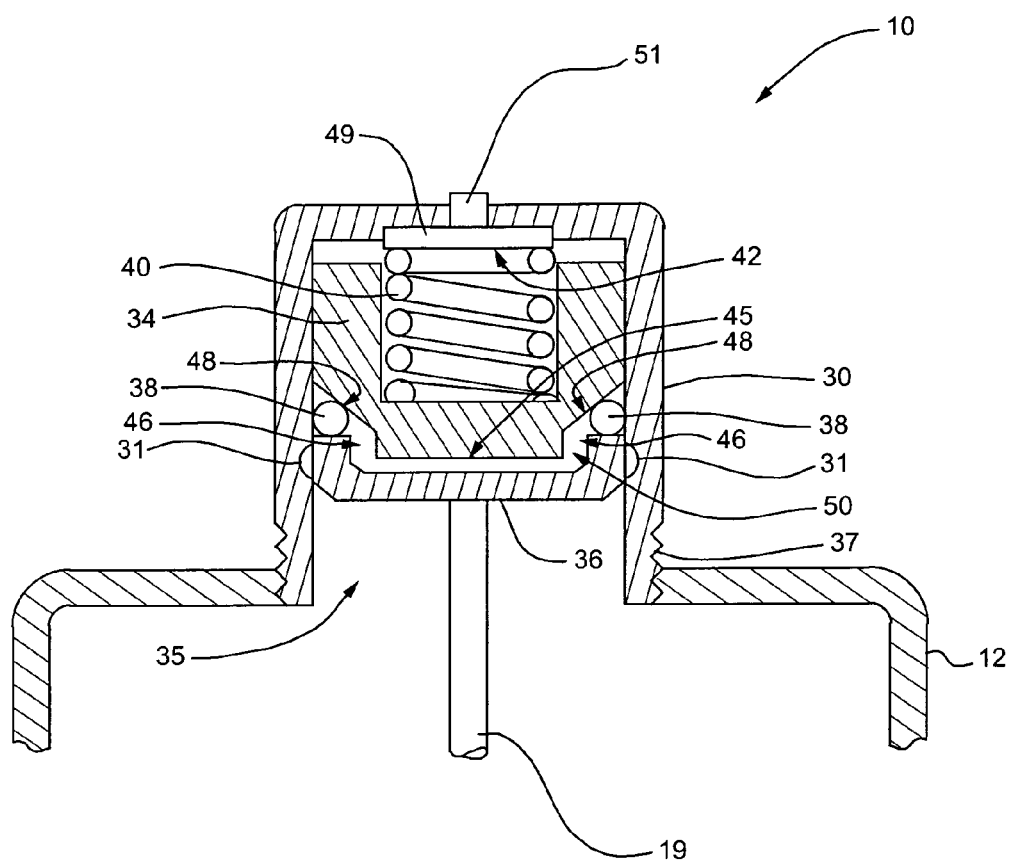
FIG. 5 is a perspective view of the quick fill device shown in FIG. 3 in a contracted position according to the present invention.

The valve controller 10, FIGS. 4–5, preferably includes a body 30 defining a cavity 32, a plunger 34, and a cap 36. The body 30 is preferably adapted to be secured to a pressure regulator 12 in any manner known to those skilled in the art. In the preferred embodiment, the body 30 includes a threaded region 37 that mates with a corresponding threaded region on the pressure regulator 12.

Figure 6:
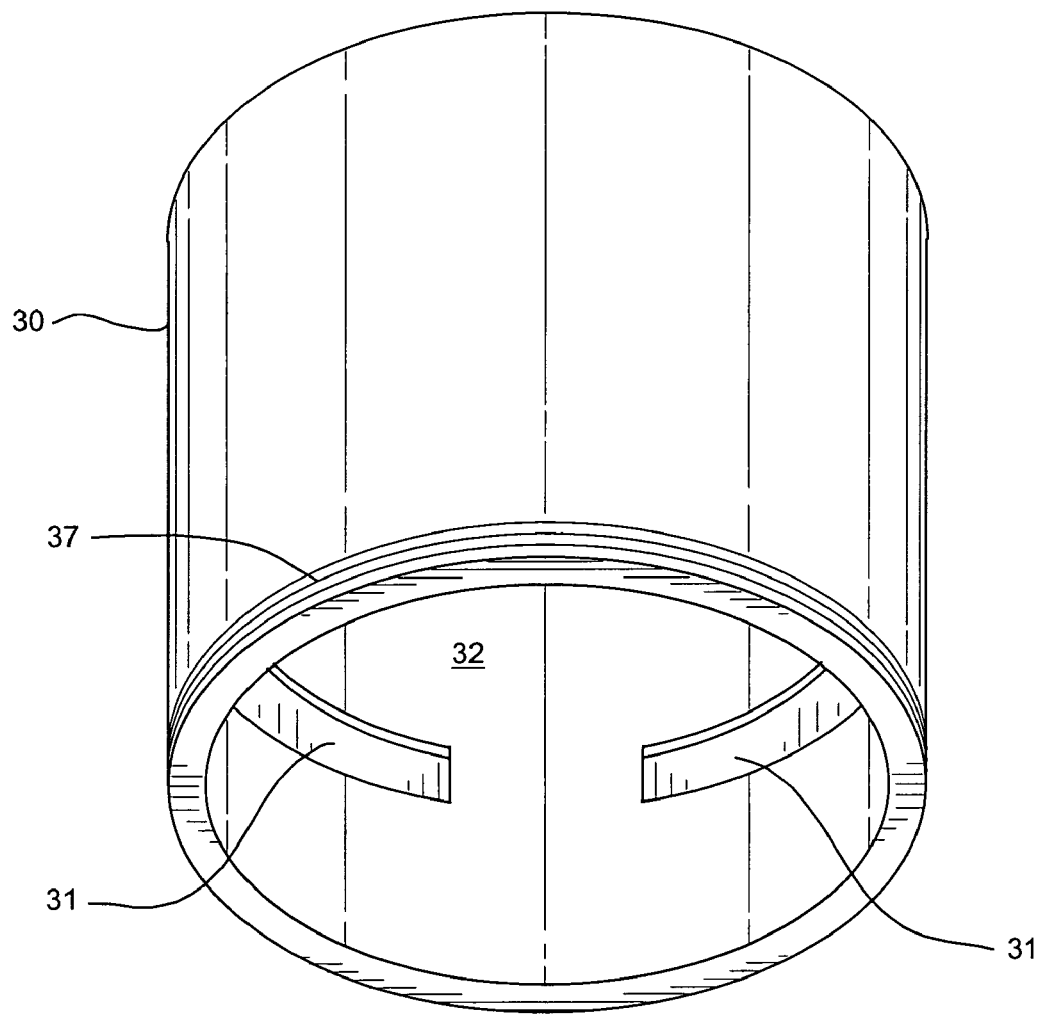
FIG. 6 is a perspective view of one embodiment of the body of the quick fill device shown in FIG. 3 according to the present invention.
Figure 7:
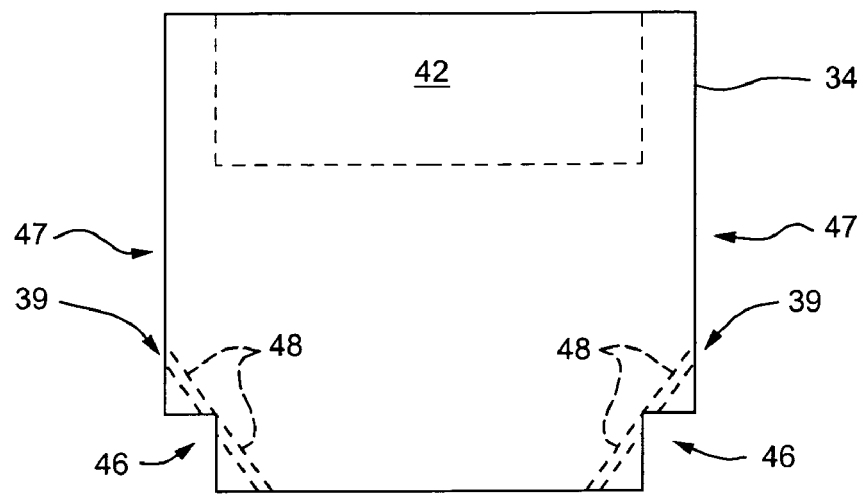
FIG. 7 is a perspective view of one embodiment of the plunger of the quick fill device shown in FIG. 3 according to the present invention.

The cavity 32 is sized and shaped to accept at least a portion of the plunger 34 and at least a portion of the cap 36, and includes a base region 33 and an opening region 35. The opening region 35, FIGS. 4–6, preferably includes at least one indentation, groove, or slot 31. The groove 31 is sized and shaped to accept a portion of a ball or ball bearing 38 such that at least half of the ball 38 is disposed within the cavity 32 and not within the groove 31. The groove 31 may include a slot disposed about the entire inner perimeter of the cavity, or alternatively may include two or more sections as will be discussed in greater detail hereinbelow.

The plunger 34, FIGS. 4–5 and 7–8, is sized and shaped to fit within the cavity 32. The plunger 34 preferably includes a notch region 46 disposed proximate a distal end 45 of the plunger 34. One or more grooves, channels, slots, or guide regions 48 are disposed within the plunger 34 proximate the distal end 45. The guide region 48 is sized and shaped to create a pathway or ramp in which the ball 38 will move as will be discussed in greater detail hereinbelow. The guide region 48 begins at the outer surface 47 of the plunger 34 proximate the top of the notch region 46 and is angled upward and away from the center of the plunger 34 such that the guide region 48 is preferably disposed through the notch region 46. In the preferred embodiment, the plunger 34 includes two guide regions 48, although this is not a limitation of the present invention.

An actuator in the form of, for example, a biasing mechanism 40, FIGS. 4–5, (preferably a spring) is disposed within the cavity 32 between the base region 33 and the plunger 34 and urges the plunger 34 away from the base region 33 and toward the opening region 35. The spring 40 is preferably disposed within a perch or cavity 42 disposed within the base region 33 of the body 30 and the proximate end region 44 the plunger 34. Optionally, an adjustable biasing mechanism 49 may be provided to adjust the amount of force generated by the biasing mechanism 40. In one example, the adjustable biasing mechanism 49 may include a set screw 51 that moves the perch up/down.

Figure 9:
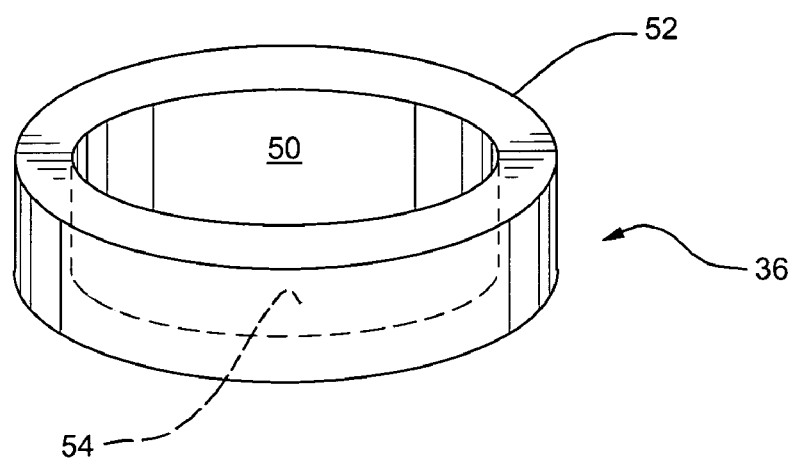
FIG. 9 is a perspective view of one embodiment of the cap of the quick fill device shown in FIG. 3 according to the present invention.
Figure 8:
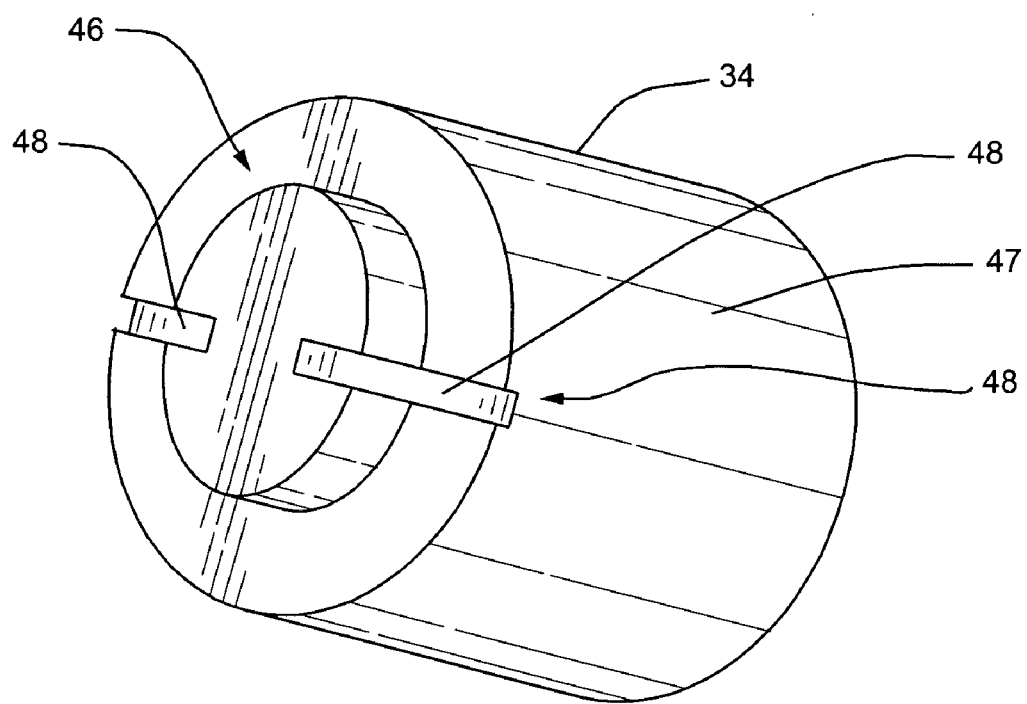
FIG. 8 is a perspective end view of one embodiment of the plunger of the quick fill device shown in FIG. 3 according to the present invention.

The cap 36, FIGS. 4–5 and 9, is preferably sized and shaped to fit within said cavity 32. The cap 36 forms a second cavity 50 having at least one leg or an upper surface 52 and a base or a bottom surface 54. The leg/upper surface 52 is sized and shaped to fit within the notch region 46 of the plunger 34 such that the leg/upper surface 52 contacts the ball 38 as shown in FIGS. 4–5.

In practice, the valve controller 10 is secured to the pressure regulator 12 and urges the rod 19 downward in the direction of arrow B, thereby overriding the pressure regulator 12 and fully opening the valve 20 and allowing water to flow freely though the pressure regulator 12 and into the boiler 1. As the pressure within the boiler 1 increases, the force F exerted upwards (i.e., opposite the arrow B) by the pressure regulator 12 through the rod 19 also increases. Once the force F exerted by the pressure regulator 12 reaches a predetermined point (corresponding to the desired maximum fill pressure within the boiler 1), the downward pressure of the actuator/biasing mechanism 40 is overcome and the cap 36 and plunger 34 move from the position shown in FIG. 4 upward to the position shown in FIG. 5, thereby allowing the rod 19 to move upwards and close the valve 20.

The force F exerted by the pressure regulator 12 through the rod 19 is transferred against the base/bottom surface 54 of the cap 36. The cap 36 transfers this force F through the leg/upper surface 52 of the cap 36 directly against the ball 38. The ball 38 is sandwiched partially within the groove 31 between the body 12 and the plunger 34. The biasing device 40 urges the plunger 34 downward, forcing the ball 38 within the groove 31.

Because the ball 38 is being forced within the groove 31 by the plunger 34, the force $F_b$ necessary to drive or push the ball 38 out of the groove 31 is significantly higher than the force generated by the biasing device 40 alone. As a result, once the force F reaches the force $F_b$ necessary to push the ball 38 out of the groove 31, the biasing device 40 is substantially instantly compressed and the plunger 34 and cap 36 are substantially instantly moved from the position shown in FIG. 4 to the position shown in FIG. 5. As the ball 38 is forced out of the groove 31, it moves along the guide or ramp region 48 of the plunger 34. The guide or ramp region 48 also prevents the ball 38 from rotating around the plunger 34.

In contrast to the known pressure regulators 12 alone (which open and close the valve 20 in relation to the pressure differential such that the valve 20 is fully open at large pressure differentials and begins to close as the pressure differential approaches zero), the valve controller 10 according to the present invention holds the valve 20 fully open while the pressure within the boiler is lower than the desired maximum fill pressure and substantially instantly closes the valve 20 once the boiler 1 reaches the desired maximum fill pressure. Because the valve 20 remains fully open until the desired maximum fill pressure within the boiler 1 is reached, the amount of time necessary to fill the boiler 1 with water is substantially reduced. Moreover, because the valve controller 10 automatically closes upon reaching the desired maximum fill pressure, the pressure within the boiler 1 never exceeds the maximum pressure allow by the pressure relief valve 4, thus preventing the dangerous situation where hot, high pressure is released.

In an alternative embodiment, the valve controller 10, FIG. 3B, is operatively connected to a relief valve 4 having an inlet 22 and an outlet 24. The relief valve 4 may include any type of relief valve 4 known to those skilled in the art, and may also include a temperature sensing device 79 as is known to those skilled in the art. In the preferred embodiment, the relief valve 4 includes a valve 20 including a stem or rod 19, a washer 81 and a seat 83. Prior art relief valves 4, FIG. 2B, typically include a spring 16 biasing the washer 81 against the seat 83 to keep the valve 20 closed. As the inlet pressure 22 exceeds a preferred maximum preset value, the biasing force of the spring 16 is overcome and the valve 20 begins to open proportionately to the inlet pressure 22. The rod 19 may also be connected to a lever 17 used to manual open the valve 20.

According to the present invention, the rod 19 is operatively connected to the valve controller 10 and the valve controller 10 is secured to the relief valve 4 in substantially the manner as described above. The valve controller 10 operates in substantially the same manner as described above. The relief valve 4 preferably does not include the spring 16.

In practice, the valve controller 10 maintains the valve 20 in the closed position. As the inlet pressure 22 increases, the pressure is transferred through the rod 19 against the valve controller 10. Once the inlet pressure 22 exceeds a predetermined value, the valve controller 10 moves from the expanded position shown in FIG. 4 to the contracted position shown in FIG. 5, thereby immediately and fully opening the valve 20. Once the inlet pressure is reduced below the predetermined value, the valve 20 is immediately and fully closed.

According to the preferred embodiment, the valve controller 10 preferably includes a manual opening device 87. The manual opening device 87 preferably includes a lever 85 pivotably disposed about an end region 86 of the stem/rod 19. The stem/rod 19 preferably includes a washer or flared region 88 disposed beneath the cap 36. As the lever 85 is rotated in the direction of the arrow H, the stem/rod 19 is moved upwards in the direction of the arrow F. The washer or flared region 88 is secured to the stem/rod 19 such that the Force F transferred by the lever 85 through the stem/rod 19 acts on the cap 36 as described above to contract the valve controller 10 as discussed above.

Modifications and substitutions by one of ordinary skill in the art are considered to be within the scope of the present invention, which is not to be limited except by the following claims. For example, the present invention is not limited to holding open pressure regulators, but may also be used to hold open (or closed) any valve.

The invention claimed is:

1. A valve controller comprising:
   a valve controller, coupled to a valve, said valve controller including
   a body defining a cavity and having a base region and an opening region, said cavity including an indentation disposed proximate said opening region, said indentation sized to accept a portion of a ball;
   a plunger disposed in said cavity and having a first and a second oppositely disposed end region, said second end region including a notch region 46 and a guide region 48, said plunger moveable in said cavity between a first position wherein said ball is disposed in said indentation of said body and contacts said guide region of said plunger, and a second position wherein said ball is dislodged from said indentation in said body and is located proximate said notch region of said plunger;
   a biasing mechanism adapted to be disposed within said first cavity between said base region of said body and said first end region of said plunger.; and
   a cap disposed within said first cavity, said cap having a base and at least one leg extending therefrom, said at least one leg sized and shaped to fit within said notch region of plunger such that said at least one leg contacts said ball.

2. The valve controller of claim 1, wherein said valve controller is operative for opening and closing a valve having a first and a second opening and a first and a second position corresponding to either a fully open or fully closed position, said valve controller establishing a maximum pressure which, when applied to said cap base, will cause said valve controller plunger to move from said first to said second position; and
   wherein said valve controller is operatively connected to said valve such that said valve controller causes said valve to remain at said normally disposed first position when said pressure at said first opening is less than said maximum pressure and wherein said valve controller causes said valve to move to said second position when said pressure at said first opening exceeds said maximum pressure.

3. The apparatus as claimed in claim 1 wherein said guide region includes a channel.

4. The apparatus as claimed in claim 1 wherein said biasing mechanism includes a spring.

5. The apparatus as claimed in claim 4 wherein said valve controller further includes a device for adjusting the biasing force of said spring.

6. The apparatus as claimed in claim 1 wherein said indentation includes a circumferential slot.

7. The apparatus as claimed in claim 1 wherein said guide region is disposed within said plunger such that a first end of said guide region is proximate an outer surface of said plunger and a second end of said guide region is disposed proximate said second end region of said plunger.

8. The apparatus as claimed in claim 1 wherein said guide region includes a first and at least a second channel oppositely disposed about said plunger, said first and said second channel sized and shaped to accept a portion of a first and at least a second ball.

9. The apparatus as claimed in claim 1 wherein said valve opens proportionally to a pressure difference between a first maximum pressure and a pressure at said outlet such that said valve opens further as said pressure difference increases and wherein said valve controller fully opens said valve at all times when said outlet pressure is below a second maximum pressure and automatically fully closes said valve when said outlet pressure reaches said second maximum pressure.

10. The apparatus as claimed in claim 1 wherein first opening includes an inlet, said second opening includes an outlet, said first position includes said fully closed position, and said second position includes said fully open position.

11. The apparatus as claimed in claim 1 wherein first opening includes an inlet, said second opening includes an outlet, said first position includes said fully open position, and said second position includes said fully closed position.

12. The valve controller of claim 1 wherein said valve controller is operatively coupled to a pressure regulator valve which is proportionately opened in relation to a pressure difference between a maximum pressure setting of said valve and an outlet pressure of said valve, such that said valve opens proportionate to said pressure difference; and said valve controller for overriding said pressure regulator valve for causing said valve to be fully open at all times when said outlet pressure of said valve is below a maximum pressure setting of said valve controller which is set below said maximum pressure setting of said valve, and for automatically fully closing said valve when said outlet pressure reaches said maximum pressure setting of said valve controller.

13. The valve controller of claim 12 wherein said valve controller further includes an actuator disposed in said cavity and coupled to said plunger, wherein said actuator forces said plunger into a first position fully opening said valve when an outlet pressure of said valve is below said maximum pressure setting of said valve controller, and wherein said outlet pressure of said valve forces said plunger into a second position automatically and fully closing said valve when said outlet pressure reaches said maximum pressure setting of said valve controller.

14. The pressure regulator as claimed in claim 13 wherein said cavity including a circumferential slot disposed proximate said opening region, said circumferential slot sized to accept a portion of a ball.

15. The pressure regulator as claimed in claim 14, wherein said guide region is disposed within said plunger such that a first end of said guide region is proximate an outer surface of said plunger and a second end of said guide region is disposed proximate said second end region of said plunger.

16. The pressure regulator as claimed in claim 15 wherein said actuator further includes said cap disposed within said first cavity, said cap defining a second cavity having said base and said at least one leg, said at least one leg sized and shaped to fit within said notch region of plunger such that said at least one leg contacts said ball.

17. The valve controller of claim 1 wherein said valve includes a pressure relief valve including an inlet and an outlet; and wherein said valve controller is operatively connected to said valve such for causing said valve to remain fully closed at all times when a pressure at said valve inlet is lower than a predetermined maximum pressure setting of said valve controller and for causing said valve to move to a fully open position at all times when said inlet pressure exceeds said maximum pressure setting of said valve controller.

18. The valve controller of claim 17 wherein said valve controller further includes an actuator disposed in said cavity and coupled to said plunger, wherein said actuator forces said plunger into a first position fully closing said valve when said inlet pressure of said valve is below said maximum pressure setting of said valve controller and wherein said inlet pressure of said valve forces said plunger into a second position automatically and fully opening said valve when said inlet pressure reaches said maximum pressure setting of said valve regulator.

19. The relief valve as claimed in claim 18 wherein said cavity including a circumferential slot disposed proximate said opening region, said circumferential slot sized to accept a portion of a ball.

20. The relief valve as claimed in claim 19 wherein said guide region is disposed within said plunger such that a first end of said guide region is proximate an outer surface of said plunger and a second end of said guide region is disposed proximate said second end region of said plunger.

21. The relief valve as claimed in claim 20 wherein said actuator further includes said cap disposed within said first cavity, said cap defining a second cavity having said base and said at least one leg, said at least one leg sized and shaped to fit within said notch region of plunger such that said at least one leg contacts said ball.

* * * * *